June 12, 1945.  J. P. JENSEN  2,378,143
PORTABLE BEET THINNER
Filed June 11, 1943  4 Sheets-Sheet 4
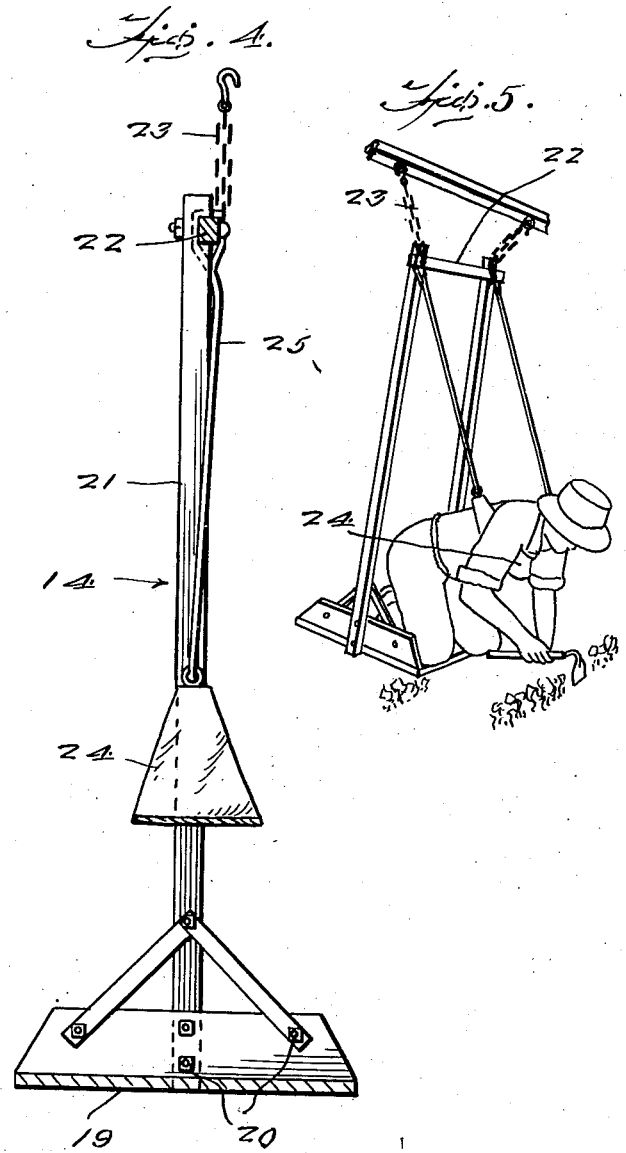
Inventor
James P. Jensen
By Clarence A. O'Brien
and Harvey B. Jacobson
Attorney Patented June 12, 1945

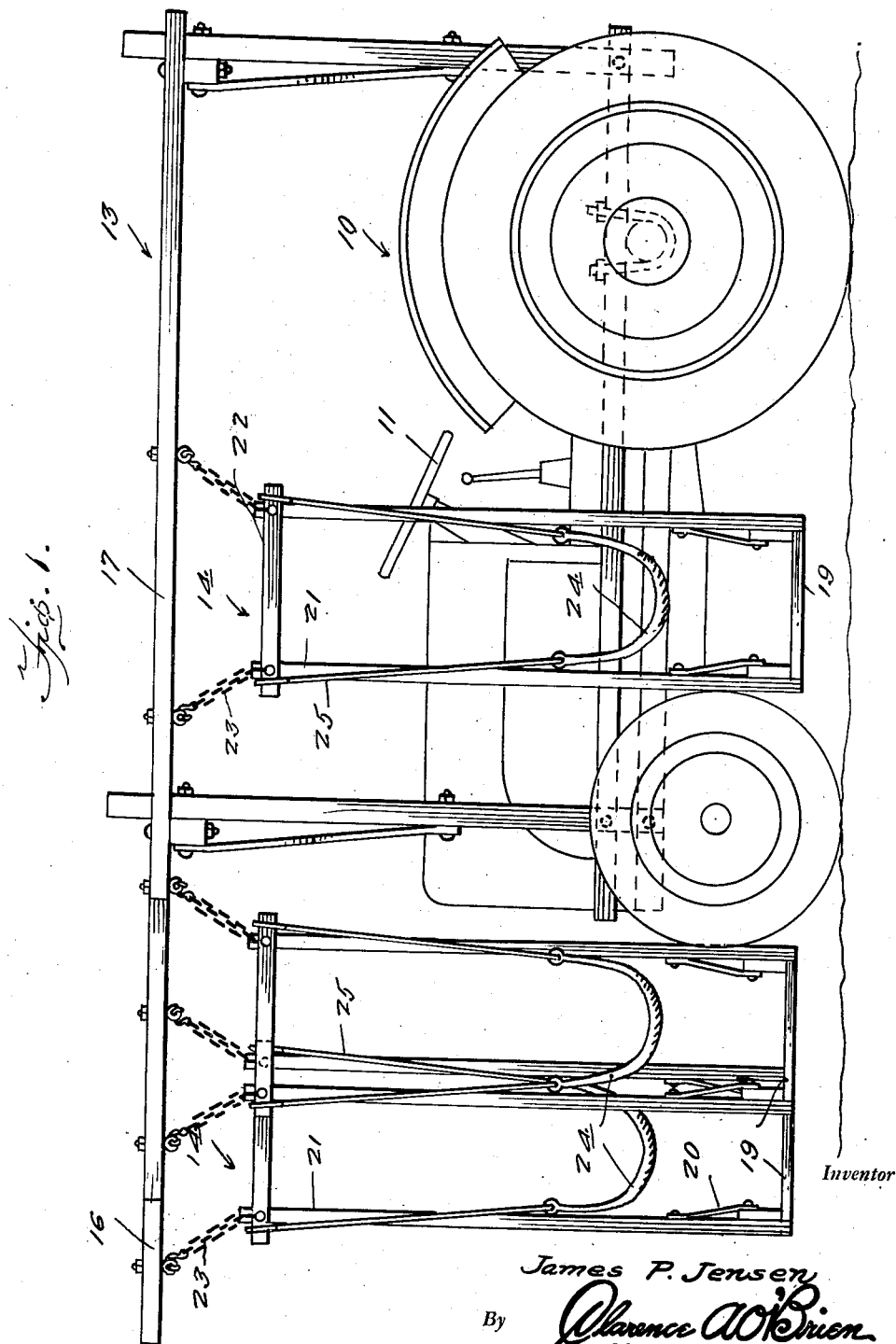

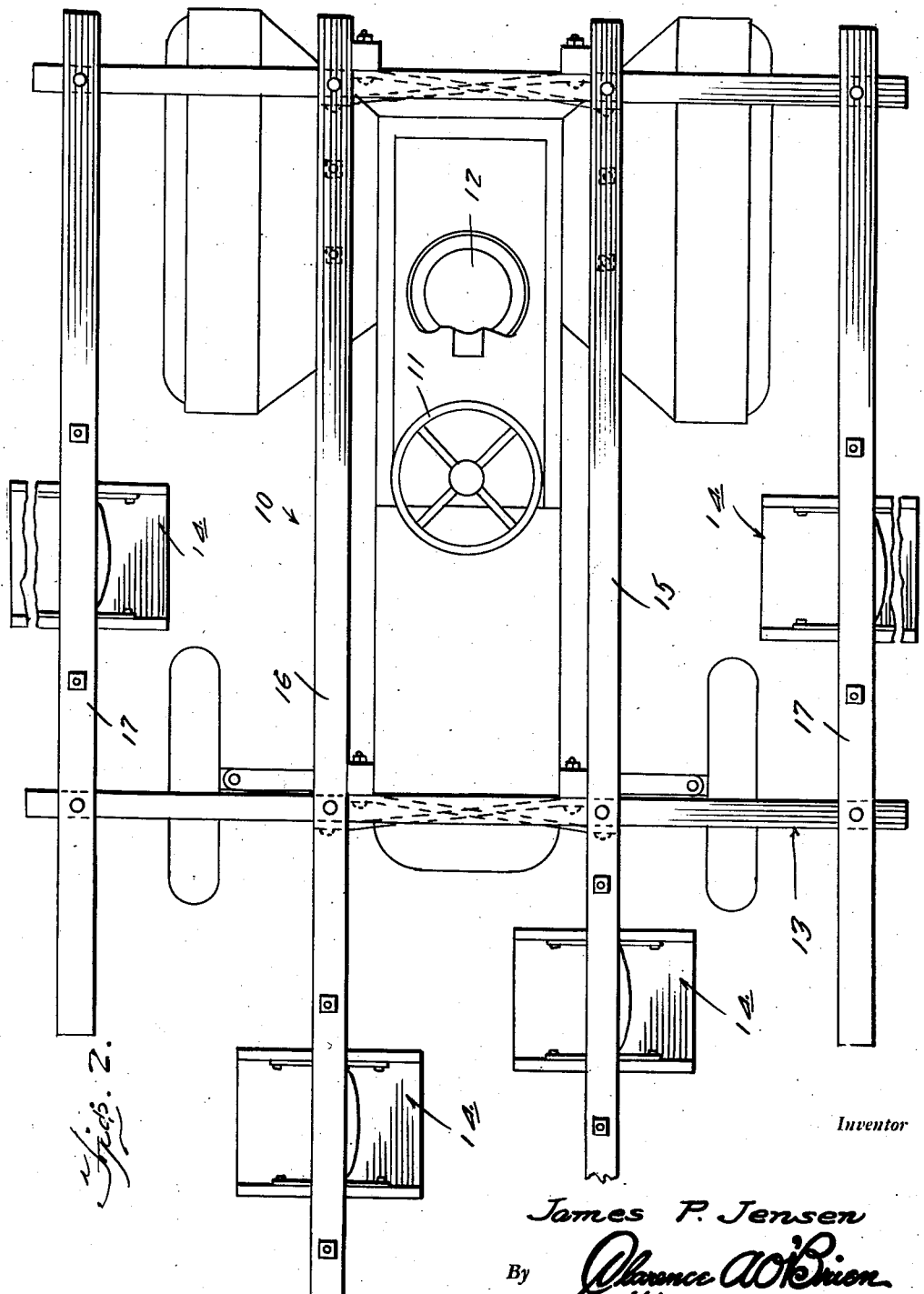

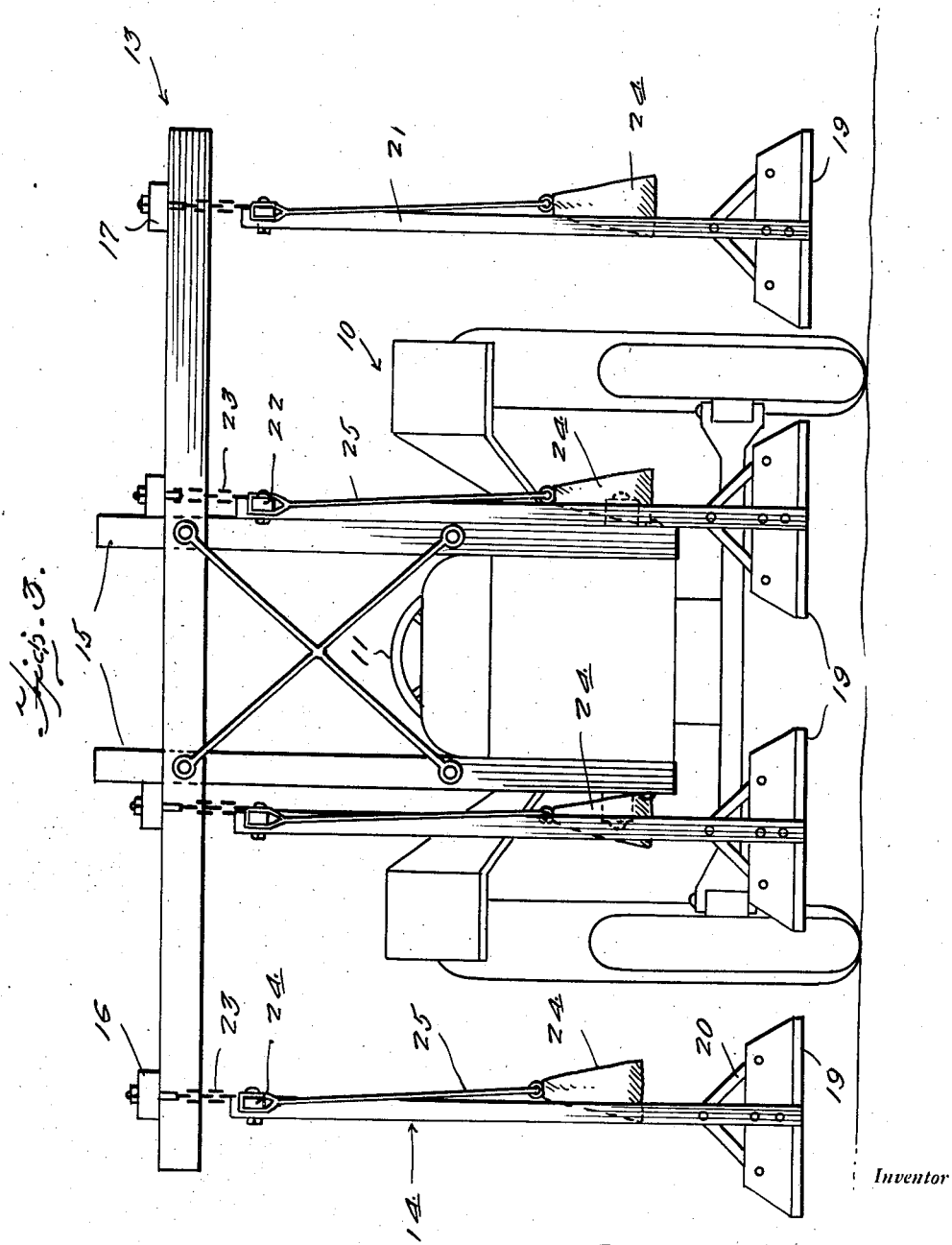

2,378,143

UNITED STATES PATENT OFFICE 2,378,143

PORTABLE BEET THINNER

James P. Jensen, Bear River City, Utah

Application June 11, 1943, Serial No. 490,524

3 Claims. (Cl. 280—29)

My invention relates to a portable apparatus for thinning growing beets or other crops and the main object of the invention is to furnish an apparatus of this class for carrying a number of workmen, 4, 8 or up to 12, for weeding out some of the plants and to give necessary support of the workmen's bodies while slowly proceeding along the field to do their work.

This device is intended for mounting on a tractor, truck or other vehicle or as a trailer on its own wheels as a permanent implement to be drawn by automobile or horses. A swing for each workman is provided so that he may work in convenient position or leaning on a sling to go under his arms to support a portion of his weight while working in a kneeling position.

In some cases it may be preferable to provide a main frame attached to a tractor, truck or other vehicle with a swing for each workman to carry him low enough to reach the beets over each row at convenient elevation over the plants. This frame may be demountable.

One embodiment of the present invention is illustrated in the accompanying drawings wherein—

Figure 1 is a side elevation of the apparatus mounted on a motor truck and provided with a number of supports in the form of swings for carrying the workmen while at work.

Figure 2 is a top plan view of Figure 1.

Figure 3 is a front elevation of the same, and

Figure 4 shows a vertical section of a swing construction,

Figure 5 shows in perspective view the position of a man in the action of thinning the beets while leaning on the swing floor and supported by the sling.

In the figures like numerals designate the same parts in the different views.

Reference character 10 denotes a motor driven truck with steering wheel 11 and seat 12 for the operator.

Upon the same is erected a strongly braced super-structure or frame 13, which may constitute a unit to be removed from the truck and used alone or mounted on another vehicle.

This frame extends high enough above the floor of the vehicle in order to suspend the swings 14 or supports to conveniently carry the workmen. These swings are suspended from the longitudinally running beams or runners 15, 16 and 17, preferably mounted parallel to the central, vertical plane of the vehicle. As shown the two outermost ones 17 are indicated as being shorter but all of them may have the same length and each carrying a sideways swinging support or swing 14, the beams 17 shown with a swing about midways between the vehicle wheels, so as to clear them when swinging in or out in staggered position.

The inner beam 15 is of the same length or shorter than its neighbor 16. By means of this construction it is possible to suspend the front swings 14 in staggered position so that they may be able to swing transversely of the vehicle without interfering with each other.

As shown in the figures and more particularly in Figure 4, the swing is constructed with a floor 19 held in position by suitable braces and bolts 20 or the like between a pair of uprights 21, which at the top are cross connected by a cross rod or brace 22. The swing is suspended by hooked chains 23 from the runners 15, 16 or 17, for detachment or removal. From the cross rod 22 is hung another swinging device consisting of a sling 24 and wires 25. This sling is intended to be placed over the workman's chest and under his arms while he is kneeling on the floor board 19 when picking up or weeding the beets in the manner illustrated in Figure 5. By momentarily raising his body from the sling, the swing will rock like a pendulum, so that the weeder can rock back and forth while working.

Although this apparatus is mainly intended for thinning the rows of beets, it may be used for many other purposes such as berry picking, cotton gathering and so forth.

The operation of the machine is the following. When growing beets are ready for thinning in order to improve and strengthen the crop, this apparatus, mounted on a vehicle such as a tractor is passed slowly over the field along the growing rows of beets, with a workman or picker placed in each of the swings. According to the drawings, four swings are provided for as many pickers or weeders, but the apparatus may be enlarged for a crew of 8 or 12 workers. In Figures 1, 2 and 3 only one type of swings 14 has been shown, namely, the kind illustrated in detail in Figure 4. In the swing 14 the worker has to kneel on the floor board with the head and upper part of the body stuck out between the wires 25 of the sling and with his chest resting upon the sling straps 24. In this manner he will be able to rock the swing back and forth, that is, laterally as regards the vehicle while weeding or thinning out the rows of beets. The driver at the same time running the vehicle forward.

The same procedure is, of course, followed in gathering cotton or picking berries from bushes, Although I have shown and described herein a preferred embodiment of the invention it is to be understood that I do not wish to limit the same thereto except as may be required by the scope of the subjoined claims.

Having described the invention, what is claimed as new is:

1. In a device of the class described, the combination with a vehicle, of a substantially rectangular frame mounted fixedly above the vehicle, and comprising transverse beams and a pair of inner runners and a pair of outer runners parallel to the length direction of the vehicle, one of said pairs of runners being longer than the other pair; at least one swing provided for each runner spaced longitudinally thereon to oscillate transversely of the vehicle without interference, and said swings each consisting of a floor board, rigid uprights and a cross brace between the upper ends of said uprights together forming a rigid structure, means for suspending the swing from the corresponding runner and a sling carried on flexible tension members, therefore, hung from said cross brace, whereby a workman kneeling on said board may lean with his chest in said sling while swinging transversely of the vehicle to work on the ground.

2. In a device of the class described, the combination with a vehicle, of a substantially rectangular frame mounted fixedly above the vehicle, and comprising transverse beams and a pair of inner runners and a pair of outer runners parallel to the length direction of the vehicle, one of said pairs of runners being longer than the other pair; at least one swing provided for each runner spaced longitudinally thereon to oscillate transversely of the vehicle without interference, and said swings each consisting of a floor board, rigid uprights and a cross brace between the upper ends of said uprights together forming a rigid structure, means for suspending the swing from the corresponding runner and a sling carried on flexible tension members, therefore, hung from said cross brace, whereby a workman kneeling on said board may lean with his chest in said sling while swinging transversely of the vehicle to work on the ground; said suspending means consisting of a pair of chains at each end of said brace having hook and eye connection with the runner.

3. In a device of the class described, the combination with a vehicle, of a substantially rectangular frame mounted fixedly above the vehicle, and comprising transverse beams and a pair of inner runners and a pair of outer runners parallel to the length direction of the vehicle, one of said pairs of runners being longer than the other pair; at least one swing provided for each runner spaced longitudinally thereon to oscillate transversely of the vehicle without interference, and said swings each consisting of a floor board, rigid uprights and a cross brace between the upper ends of said uprights together forming a rigid structure, means for suspending the swing from the corresponding runner and a sling carried on flexible tension members, therefore, hung from said cross brace, whereby a workman kneeling on said board may lean with his chest in said sling while swinging transversely of the vehicle to work on the ground; said suspending means consisting of a pair of chains at each end of said brace having hook and eye connection with the runner; said sling being positioned between said uprights substantially in the same vertical plane as said swing.

JAMES P. JENSEN.